(12) United States Patent
Alvarado et al.

(10) Patent No.: US 11,118,983 B2
(45) Date of Patent: Sep. 14, 2021

(54) QUICK CONNECT TEMPERATURE SENSING ASSEMBLY FOR MEASURING TEMPERATURE OF A SURFACE OF A STRUCTURE

(71) Applicant: DAILY THERMETRICS CORP., Houston, TX (US)

(72) Inventors: Carlos Alvarado, Houston, TX (US); Raymond B. Litteaur, Missouri City, TX (US); Larry Welch, Richmond, TX (US)

(73) Assignee: Daily Thermetrics Corp., Houston, TX (US)

( * ) Notice: Subject to any disclaimer, the term of this patent is extended or adjusted under 35 U.S.C. 154(b) by 0 days.

(21) Appl. No.: 16/649,187

(22) PCT Filed: Oct. 1, 2019

(86) PCT No.: PCT/US2019/053954
§ 371 (c)(1),
(2) Date: Mar. 20, 2020

(87) PCT Pub. No.: WO2020/072416
PCT Pub. Date: Apr. 9, 2020

(65) Prior Publication Data
US 2021/0215548 A1    Jul. 15, 2021

Related U.S. Application Data

(60) Provisional application No. 62/739,537, filed on Oct. 1, 2018.

(51) Int. Cl.
*G01K 7/00* (2006.01)
*G01K 7/06* (2006.01)
*G01K 1/143* (2021.01)

(52) U.S. Cl.
CPC .............. *G01K 7/06* (2013.01); *G01K 1/143* (2013.01)

(58) Field of Classification Search
USPC ......................... 374/208, E1.1011; 73/866.5
See application file for complete search history.

(56) References Cited

U.S. PATENT DOCUMENTS 2,779,810 A    1/1957  Horbinski
4,385,197 A *  5/1983  Schwagerman ......... G01K 7/04
                                                    136/221

(Continued)

FOREIGN PATENT DOCUMENTS

WO    2018/047375    3/2018

OTHER PUBLICATIONS

International Search Report and Written Opinion dated Feb. 10, 2020 for corresponding PCT Application No. PCT/US19/53954.

*Primary Examiner* — Lisa M Caputo
*Assistant Examiner* — Nasir U. Ahmed
(74) *Attorney, Agent, or Firm* — Diana M. Sangalli; Duane Morris LLP

(57) ABSTRACT

In one aspect, a temperature sensing assembly for measuring temperature of a surface of a structure includes a thermocouple device and a docking device. The thermocouple device includes a temperature sensing junction point disposed within an elongate sheath to measure the temperature of the surface of the structure at a desired location. The thermocouple device further comprises a contact portion configured to contact the surface of the structure. The docking device has a bottom surface to attach to the surface of the structure adjacent the desired location. A line extends through the center of the sheath and the sheath has a cross-sectional area in a plane perpendicular to the line. The contact portion is configured such that, when the docking device is coupled to the surface, an area of contact between (Continued)

the contact portion and the surface of the structure is greater than the cross-sectional area of the sheath.

12 Claims, 9 Drawing Sheets

(56) References Cited

U.S. PATENT DOCUMENTS

| | | | |
|---|---|---|---|
| 4,454,370 A | 6/1984 | Voznick | |
| 6,257,758 B1 | 7/2001 | Culbertson | |
| 6,390,670 B1* | 5/2002 | Nimberger | C08L 79/08 |
| | | | 374/142 |
| 6,390,676 B1* | 5/2002 | Colombo | B32B 27/08 |
| | | | 383/109 |
| 9,557,225 B2 | 1/2017 | Daily et al. | |
| 2005/0221244 A1* | 10/2005 | Nguyen | F23N 5/107 |
| | | | 431/80 |
| 2006/0219285 A1* | 10/2006 | Nguyen | F23N 5/107 |
| | | | 136/230 |
| 2010/0037689 A1* | 2/2010 | Arzberger | G01K 1/14 |
| | | | 73/295 |
| 2012/0211933 A1 | 8/2012 | Goto | |

* cited by examiner

QUICK CONNECT TEMPERATURE SENSING ASSEMBLY FOR MEASURING TEMPERATURE OF A SURFACE OF A STRUCTURE

CROSS-REFERENCE TO RELATED APPLICATIONS

This application is a national phase entry under 35 U.S.C. § 371 of international patent application no. PCT/US2019/053954, filed Oct. 1, 2019, which claims priority to U.S. Provisional Patent Application No. 62/739,537, filed on Oct. 1, 2018, the entireties of which are hereby incorporated herein by reference.

TECHNICAL FIELD

The present invention relates generally to sensing temperature, and, more particularly, to sensing temperature on the surface of a structure, such as a high temperature reactor vessel.

BACKGROUND

The petrochemical and refining industries generally employ various processes where temperature must be measured reliably and with a high degree of accuracy. Typically, the environments in which temperature is measured require subjecting the temperature sensing devices to extreme conditions, including temperatures in excess of 1300° F. These harsh conditions present challenges with respect to reliably providing accurate temperature measurements of a particular structure over extended periods of time. For instance, it is oftentimes desirable to acquire temperature measurements of various structures, such as the surface (or skin) of tubes or other conduits that are present within a furnace or the surface (or skin) of a high temperature vessel used in a refining process to ensure both that the structure is not overheating and that the process is occurring at a desired temperature. Typically, these temperature measurements are taken by fixedly attaching the temperature sensor to the outer surface of the structure, such as by welding. However, due to the extreme temperatures to which the sensor is exposed, the sensor's useful life may be limited and, as a result, the temperature sensing device often is replaced multiple times over the life of the vessel, which requires shutdown of the refining process. Consequently, if a failed instrumentation cannot be readily removed and a replacement readily installed, the processing downtime can be extremely costly.

In some circumstances, it may be desirable to acquire temperature measurements at locations on the surface of the structure where a temperature sensor previously has not been attached. As with replacement of failed sensors, the addition of new sensors again requires costly shutdown of the refining process.

SUMMARY

In one aspect, a temperature sensing assembly for measuring temperature of a surface of a structure includes a thermocouple device and a docking device. The thermocouple device includes a temperature sensing junction point disposed within an elongate sheath to measure the temperature of the surface of the structure at a desired location. The thermocouple device further comprises a contact portion configured to contact the surface of the structure. The docking device has a bottom surface to attach to the surface of the structure adjacent the desired location, the thermocouple device coupled to the docking device. A line extends through the center of the sheath and the sheath has a cross-sectional area in a plane perpendicular to the line. The contact portion is configured such that, when the docking device is coupled to the surface, an area of contact between the contact portion and the surface of the structure is greater than the cross-sectional area of the sheath.

In another aspect, a temperature sensing assembly for measuring temperature of a surface of a structure comprises a thermocouple device and a docking device. The thermocouple device has a temperature sensing junction point to measure the temperature of the surface of the structure. The docking device has a bottom surface configured to couple to the surface of the structure, the thermocouple device coupled to the docking device. The bottom surface defines a perimeter. The junction point is disposed outside the perimeter of the bottom surface such that, when the docking device is coupled to the surface of the structure, the junction point is positioned to measure the temperature at a point on the surface of the structure that is spaced apart from the docking device.

In another aspect, a method of monitoring temperature of a surface of a structure is provided. The method includes attaching a thermocouple device to a docking device, the thermocouple device having a temperature sensing junction point disposed within an elongate sheath and a contact portion configured to contact the surface of the structure. The method further includes attaching a bottom surface of the docking device to the surface of the structure. A line extends through the center of the sheath and the sheath has a cross-sectional area in a plane perpendicular to the line. The contact portion is configured such that, when the docking device is coupled to the surface, an area of contact between the contact portion and the surface of the structure is greater than the cross-sectional area of the sheath.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
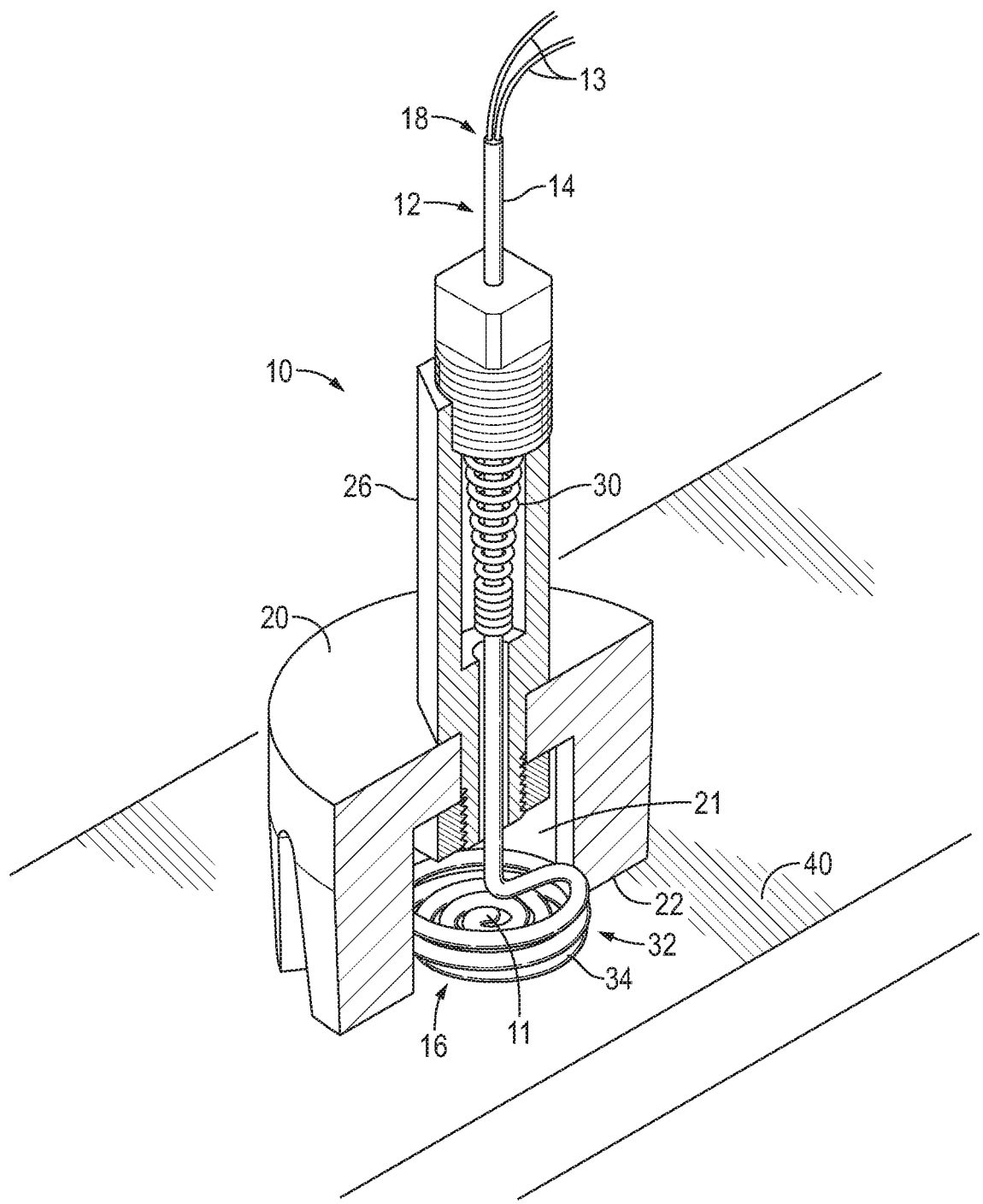
FIG. 1 is a cross-sectional perspective view of an exemplary temperature sensing assembly attached to the surface of a structure, according to an embodiment.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The temperature sensing assemblies described herein are configured to measure the temperature of a surface of a structure. These assemblies include features that increase the accuracy of such measurements. For example, in some embodiments, the temperature sensing assemblies include thermocouple devices that have features that increase the area of contact with the surface of the structure. Further, in some embodiments disclosed herein, the junction point of the thermocouple device is positioned away from the docking device that couples the assembly to the surface of the structure. This reduces or eliminates the influence that the docking device has on the temperature measurement.

Figure 2:
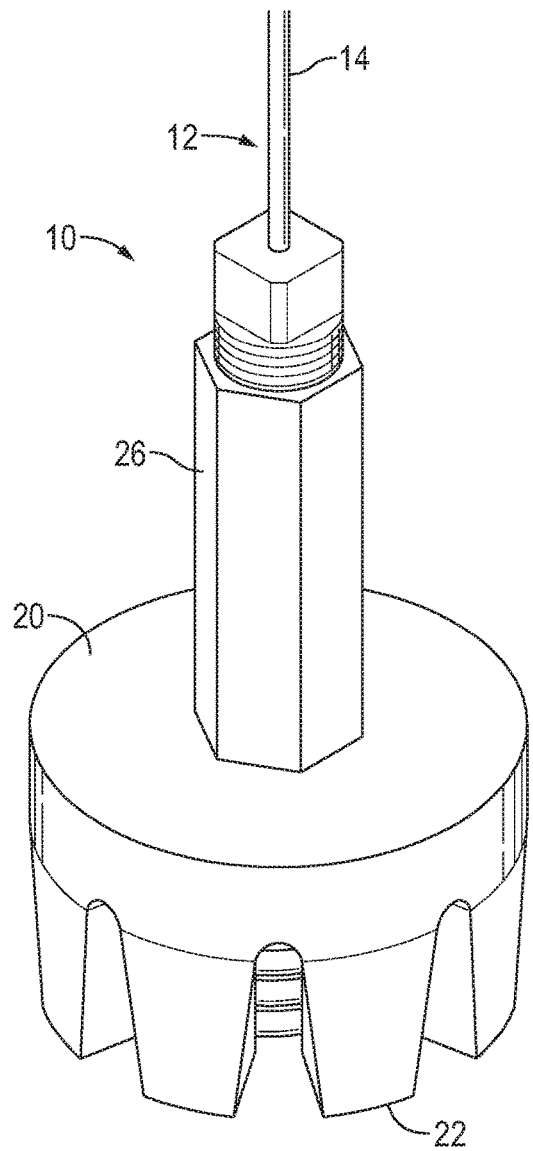
FIG. 2 shows a perspective view of the temperature sensing assembly of FIG. 1.
Figure 3:
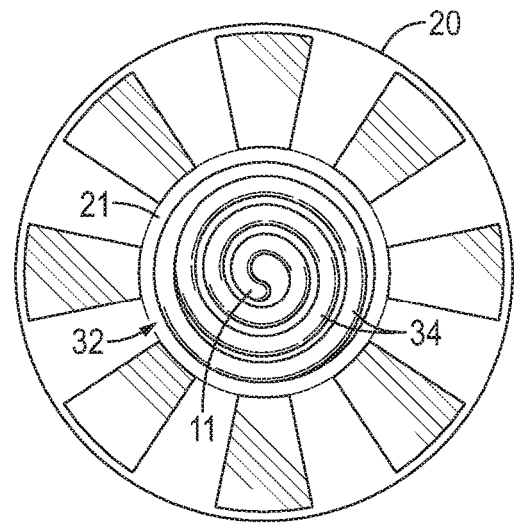
FIG. 3 shows an end view of the temperature sensing assembly of FIG. 1.

FIG. 1 is a cross-sectional perspective view of a temperature sensing assembly 10 for sensing the temperature at a surface 40 of a structure, such as a furnace tube or a high temperature vessel in which a hydrocarbon refining or reaction process occurs. FIGS. 2 and 3 are perspective and bottom views, respectively, of the temperature sensing assembly 10. The assembly 10 is arranged so that a temperature sensor can be readily installed at any desired location on the surface 40 of the structure. Towards that end, the temperature sensing assembly 10 shown in FIG. 1 includes a thermocouple device 12 having at least one temperature sensing junction point 11 formed by a conductor pair 13 that is disposed within an elongated sheath 14. The sheath 14 has a distal end 16 and an opposed end 18 from which the conductor pair 13 extends. In some embodiments, the conductor pair 13 comprises a pair of conductors made of dissimilar materials, preferably metals that are joined at the junction point 11 that is located at the distal end 16 of the sheath 14. The junction point 11 can be exposed at the outer surface of the sheath 14 or may be entirely contained within the sheath 14 at or proximate the distal end 16. As an example, the dissimilar materials may be welded together to form the junction point 11. The free ends of the conductor pair 13 are connected to instrumentation, e.g., a voltmeter, that measures the difference in potential created at the junction of the two metals. This difference in potential corresponds to a given temperature.

Figure 4:
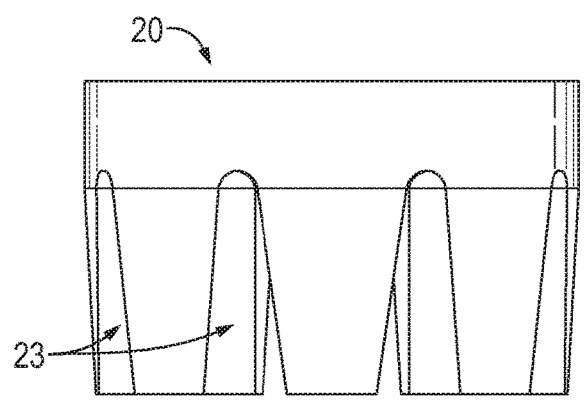
FIG. 4 shows a side view of the docking device of the temperature sensing assembly of FIG. 1.
Figure 5:
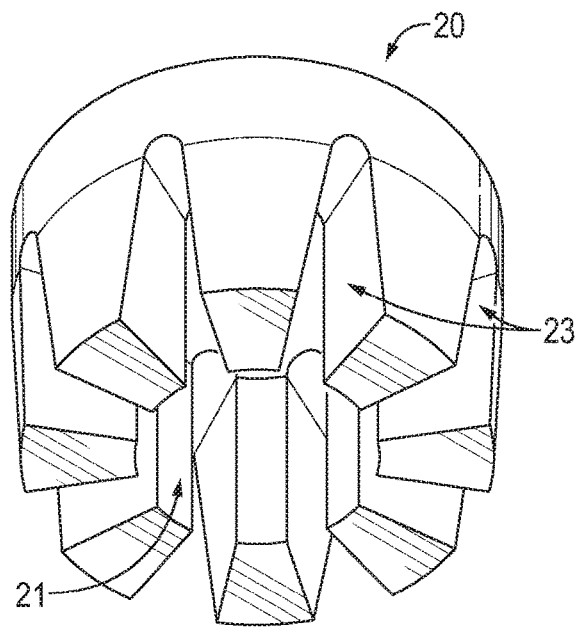
FIG. 5 shows a perspective view of the docking device of the temperature sensing assembly of FIG. 1.

In some embodiments, the temperature sensing assembly 10 further includes a mounting or docking device 20 that enables the assembly 10 to be quickly and removably connected to the surface 40 of the structure. The docking device 20 is shown in detail in FIGS. 4 and 5. In an exemplary embodiment, the docking device 20 is made of a magnetic material, such as Alnico (an iron alloy that includes aluminum, nickel, and cobalt), so that the docking device 20 can be magnetically coupled to a desired location on the surface 40. For instance, the docking device 20 can have a holding force in the range of 70-150 pounds, but other holding forces also are contemplated. In general, the magnetic material from which the docking device 20 is made retains its magnetization properties at high temperatures. For instance, the magnetic material may retain approximately 90% of its room temperature magnetization at temperatures up to 1000° F.

In other embodiments, the docking device 20 may be made of a nonmetallic material and may be configured so that the bottom surface 22 of the device 20 can be welded to the surface 40 of the structure. In yet other embodiments, the docking device 20 may further be configured so that it can be attached to the surface of the structure 40 with a fastener, such as a screw.

The bottom surface 22 of the docking device 20 can be substantially flat for coupling to a flat surface of the structure. Alternatively, the bottom surface 22 can be concave for coupling to a convex surface of the structure.

In the embodiment shown, the docking device 20 includes a recessed portion 21. In embodiments, the recessed portion can be filled with a thermally insulative material (not shown) (e.g., ZIRCAR™ SALI Moldable or ZIRCAR™ AX Moldable insulation), which serves to insulate the thermocouple device 12 from the ambient air (and the docking device 20) and that can withstand the high temperatures present in the environment in which the assembly 10 is deployed. For instance, in some applications, the assembly 10 may be exposed to temperatures in excess of 1000° F. In this manner, the thermocouple device 12 can more accurately sense the temperature at the selected location on the surface of the vessel. In the embodiment shown, the recessed portion 21 is not filled with a thermally insulative material. In some embodiments, as shown, for example, in FIGS. 4 and 5, the docking device includes apertures 23 extending through the wall of the docking device 20 and into the recessed portion 21. The apertures 23 may receive portions of the thermally insulative material to restrict rotation of the thermally insulative material relative to the docking device 20. In some embodiments, the apertures 23 may further allow for the passage of the sheath 14, as described herein and shown in FIGS. 13 and 14.

Returning to FIG. 1, in the embodiment shown, the assembly 10 further includes an adapter 26 for receiving the sheath 14 of the thermocouple device 12. The adapter 26 may be, for example, as described in U.S. Pat. No. 9,557,225, which is hereby incorporated herein by reference in its entirety. In some embodiments, the adapter 26 may be made of a magnetic material. In some embodiments, regardless of the material, the adapter 26 can be spring loaded with a spring or other resilient member 30. In such embodiments, the sheath 14 may translate within the adapter 26. In other embodiments, the sheath 14 may be fixedly coupled to the adapter 26. In still other embodiments, the sheath 14 may be directly coupled to the docking device 20 and an adapter may not be needed.

Figure 8:
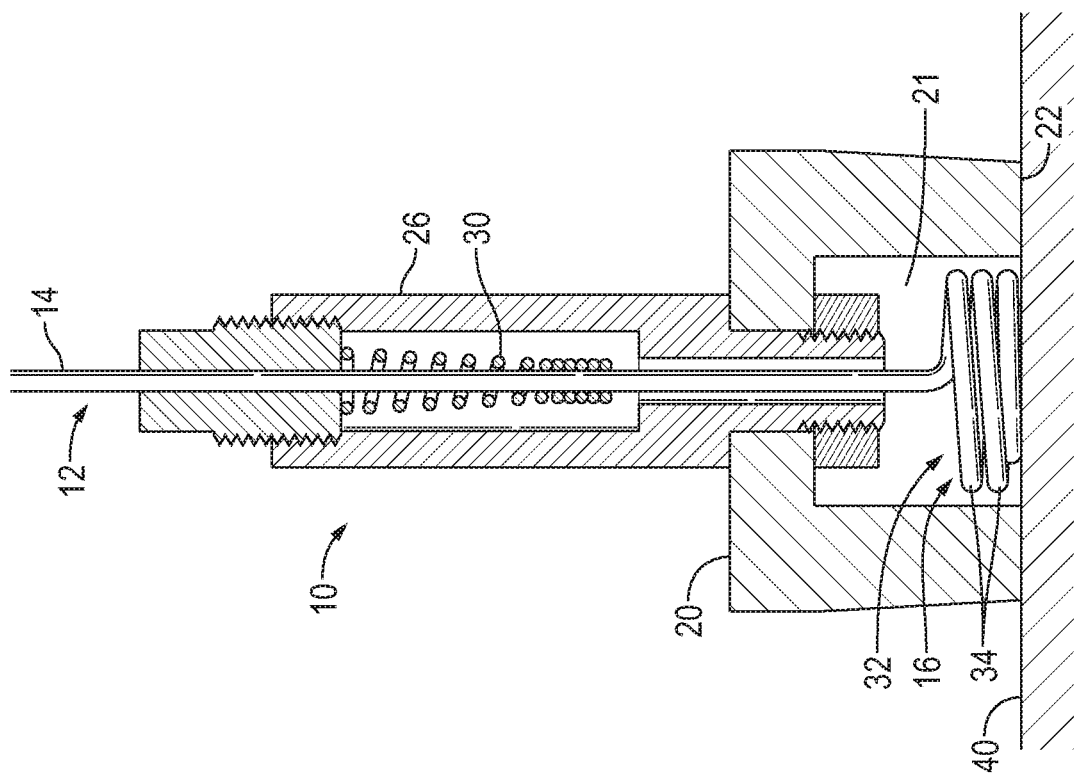
FIG. 8 shows a cross-sectional view of the temperature sensing assembly of FIG. 7 with the coils of the thermocouple device in a compressed state.
Figure 7:
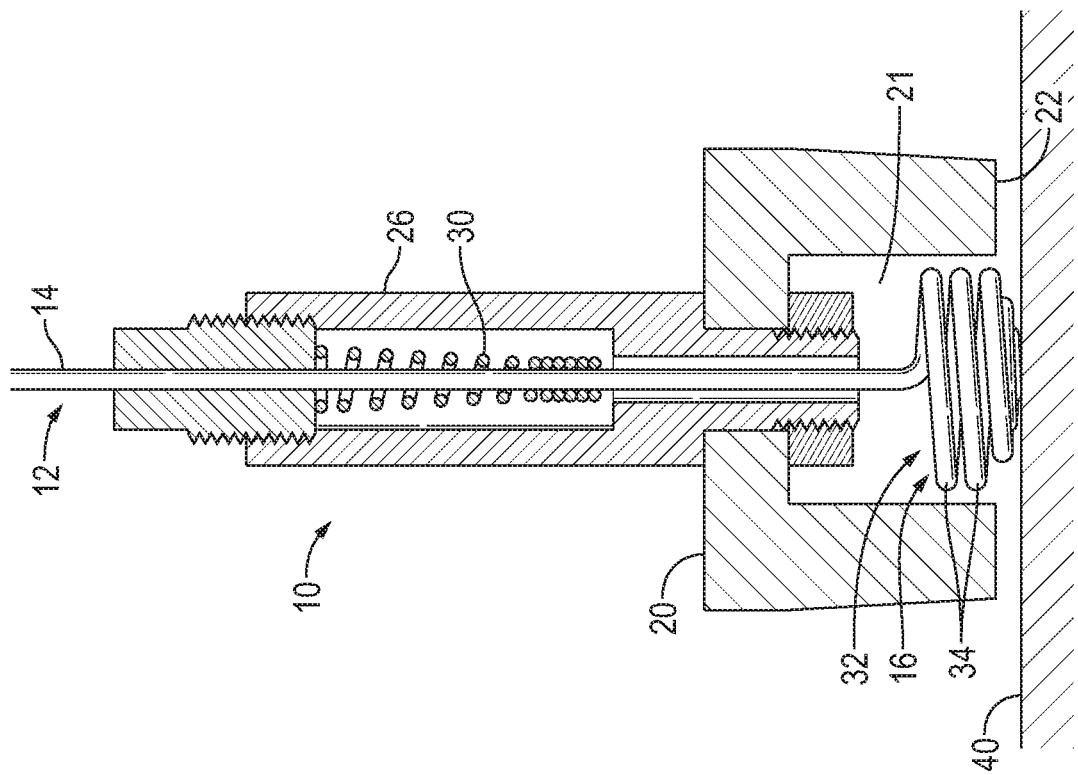
FIG. 7 shows a cross-sectional view of a temperature sensing assembly, according to an embodiment, with the coils of the thermocouple device in a decompressed state.

In embodiments in which the adapter 26 is spring loaded, when not attached to the surface of a structure, the spring 30 (or other biasing device) of the adapter 26 is not compressed or loaded, and the distal end 16 of the sheath 14 of the device 12 protrudes past the bottom surface 22 of the docking device 20, as shown in FIG. 7. When the docking device 20 is attached to a desired location on the surface 40, the bottom surface 22 of the docking device 22 contacts the surface 40 of the structure, and the distal end 16 of the device 12 moves against the force of the spring 30 or other biasing device, as shown in FIG. 8. The spring 30 is sufficiently biased so that the distal end 16 of the device 12 (which contains the junction point 11) remains in contact with the surface 40 of the structure to which the docking device 20 is attached. In this manner, the spring loaded adapter 26 helps to maintain the distal end 16, and thus the junction point 11, in close proximity to the surface 40 of interest so that accuracy of the temperature measurements made by the assembly 10 is enhanced.

Figure 6:
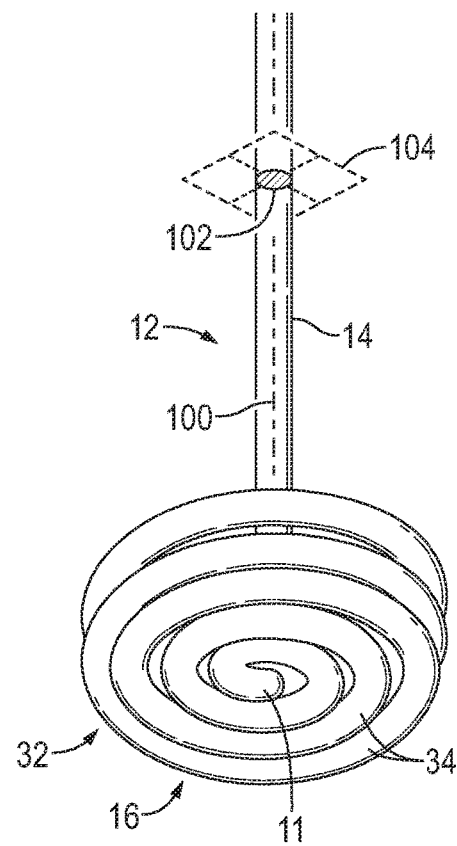
FIG. 6 shows a perspective view of the thermocouple device of the temperature sensing assembly of FIG. 1.

As shown in FIG. 6, a line 100 extends through the center of the sheath 14 along the length of the sheath 14. Further, as shown in FIG. 6, the sheath has a cross-sectional area 102 in a plane 104 perpendicular to the line 100. As will be described further herein, in various embodiments, the thermocouple device 12 further includes a contact portion 32 that is configured such that, when the docking device 20 is coupled to the surface 40, an area of contact between the contact portion 32 and the surface 40 is greater than the cross-sectional area 102 of the sheath 14.

In the embodiment of FIGS. 1-3 and 6-8, the contact portion 32 includes one or more coils 34 of the sheath 14 at the distal end 16 of the sheath 14. As shown best in FIGS. 1, 3 and 6, two or more of the coils 34 may be spiraled so that they are concentric and are generally positioned within the same plane. In other words, an outer coil 34 may define a boundary (e.g., a circular boundary) and one or more other coils 34 may be disposed within the boundary. In such an embodiment, multiple coils 34 may come into contact with the surface 40 when the temperature sensing assembly 10 is coupled to the surface 40. Alternatively, or additionally, some or all of the coils 34 can have the same diameter. In either case, when the docking device 20 is coupled to the surface 40, one or more or all of the coils 34 are driven into contact with the surface 40 of the structure to which the assembly 10 is mounted. The sheath 14 may include any number of coils 34. In various embodiments, the sheath 14 includes two or more coils 34.

Through the inclusion of the coils 34, when the temperature sensing assembly 10 is coupled to the surface 40 (e.g., via the docking device 20), the contact portion 32 is in contact with the surface 40 and the area of contact between the contact portion 32 and the surface 40 is greater than the cross-sectional area 102 of the sheath 14. This increased contact area may increase the heat transfer between the measured surface 40 and the thermocouple device 12 and, consequently, the accuracy of the temperature measurement. In various embodiments, when the temperature sensing assembly 10 is coupled to the surface 40, the portion of the sheath 14 that comes into contact with the surface 40 (e.g., the coils 34) may be deformed or compressed (e.g., by the force of the spring 30) to further increase the contact area with the surface 40.

FIG. 7 shows a first cross-sectional view of an embodiment of the assembly 10 before the bottom surface 22 of the docking device 20 is brought into contact with the surface 40. As can be seen in FIG. 7, the contact portion 32 may extend at least partially past the bottom surface 22. FIG. 8 shows a second cross-sectional view with the bottom surface 22 of the docking device 20 in contact with the surface 40. As can be seen by comparing FIG. 7 and FIG. 8, the coils 34 may compress together as the docking device 20 comes into contact with the surface 40. In embodiments, such as the embodiment shown in FIGS. 7 and 8, the coils 34 may be sufficiently resilient so that the spring 30 of the adapter 26 can be eliminated.

Figure 9:
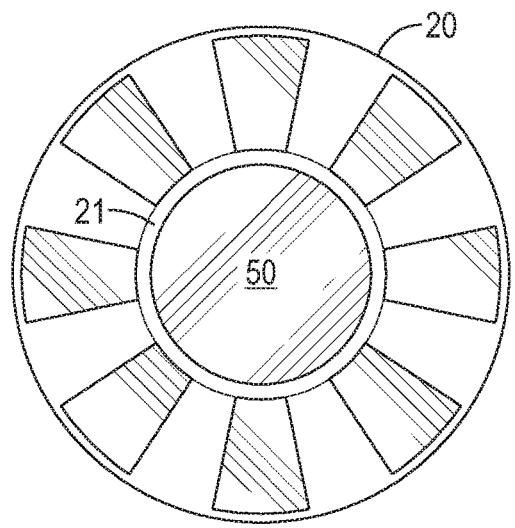
FIG. 9 shows an end view of a temperature sensing assembly, according to another embodiment.
Figure 10:
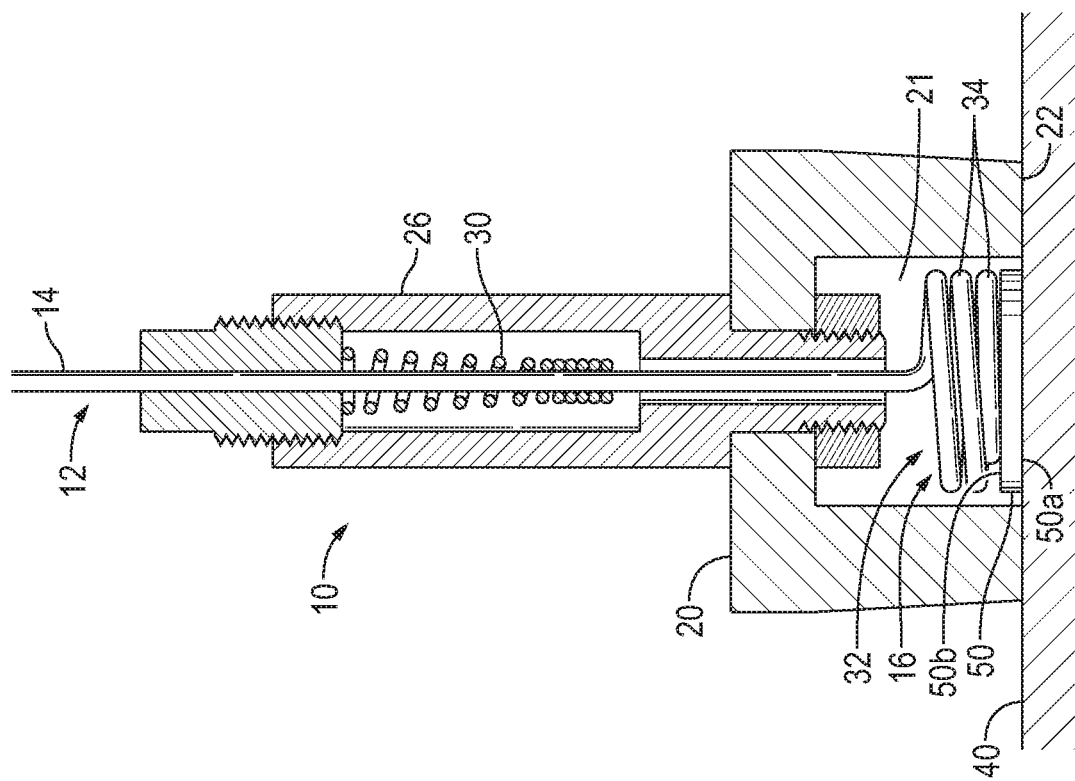
FIG. 10 shows a cross-sectional view of the temperature sensing assembly of FIG. 9 with the coils of the thermocouple device in a decompressed state.
Figure 11:
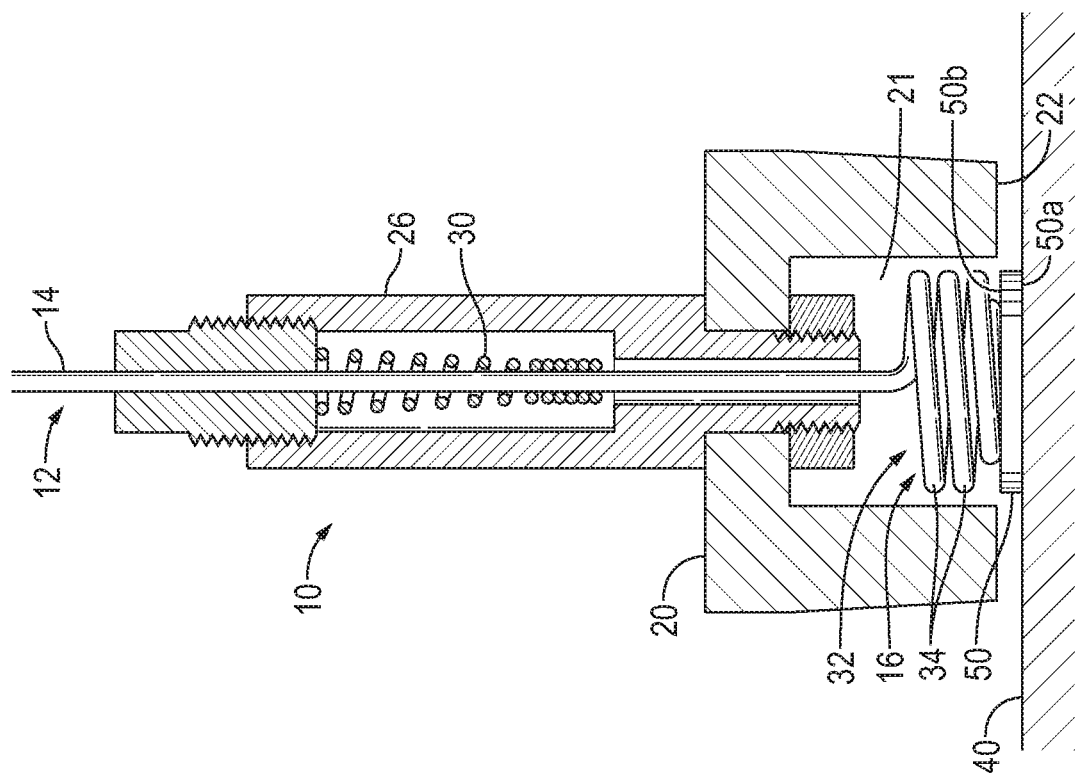
FIG. 11 shows a cross-sectional view of the temperature assembly of FIG. 9 with the coils of the thermocouple device in a compressed state.

FIGS. 9-11 show another embodiment of the assembly 10 in which the contact portion 32 of the thermocouple device includes coils 34 of the sheath 14 at the distal end 16. In this embodiment, the contact portion 32 further includes a pad 50 coupled to the coiled distal end 16 of the sheath 14. The pad 50 is configured such that, when the docking device 20 is coupled to the surface 40, a first side 50a of the pad 50 is in contact with the surface 40 and a second side 50b, opposite the first side 50a, is coupled to the sheath 14 (e.g., a coil 34). The pad 50 can be coupled to the sheath 14 in any appropriate manner. For example, in some embodiments, the pad 50 is welded to the sheath 14. In some embodiments, as shown in FIG. 9, the pad 50 is in the form of a circular disc. The first side 50a of the pad 50 may be substantially flat. Alternatively, the first side 50a may be concave to maintain close contact with a convex surface 40.

The pad 50 may be sized such that a gap is present between the pad 50 and the inner wall of the recessed portion 21 of the docking device 20. This may reduce the amount of heat transfer between the docking device 20 and the pad 50 to reduce the impact of the temperature of the docking device 20 on the temperature measurement. In various embodiments, the gap between the pad 50 and the inner wall of the recessed portion 21 is between about 0.01 inches and about 0.125 inches. Because the pad 50 may define a larger contact area with the surface 40 than the cross-sectional area 102 of the sheath 14, the pad 50 may more accurately respond to changes in temperature of the surface 40, thereby increasing the accuracy of the temperature measurements. The pad 50 may be made of a thermally conductive material—such as, for example, copper, aluminum, brass, steel, or bronze.

As shown in FIG. 10, prior to coupling the temperature sensing assembly 10 to the surface 40, the pad 50 may be at least partially below the bottom surface 22 of the docking device 20. As shown in FIG. 11, as the docking device 20 is coupled to the surface 40 of the structure, the coils 34 may compress to allow the bottom surface 22 of the docking device 20 to contact and engage the surface 40.

Figure 12:
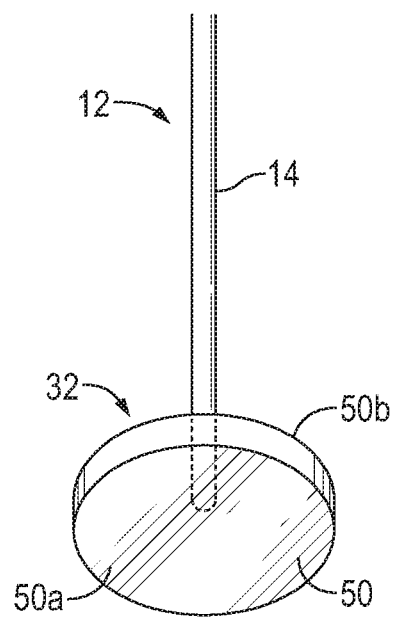
FIG. 12 shows a perspective view of a thermocouple device, according to another embodiment.

In some embodiments, the pad 50 may be used in conjunction with a coiled sheath 14, as shown in FIGS. 9-11. In other embodiments, shown in FIG. 12, the pad 50 is used with a straight sheath 14. In such embodiments, the end of the sheath 14 may be coupled to the second side 50b of the pad 50.

Figure 13:
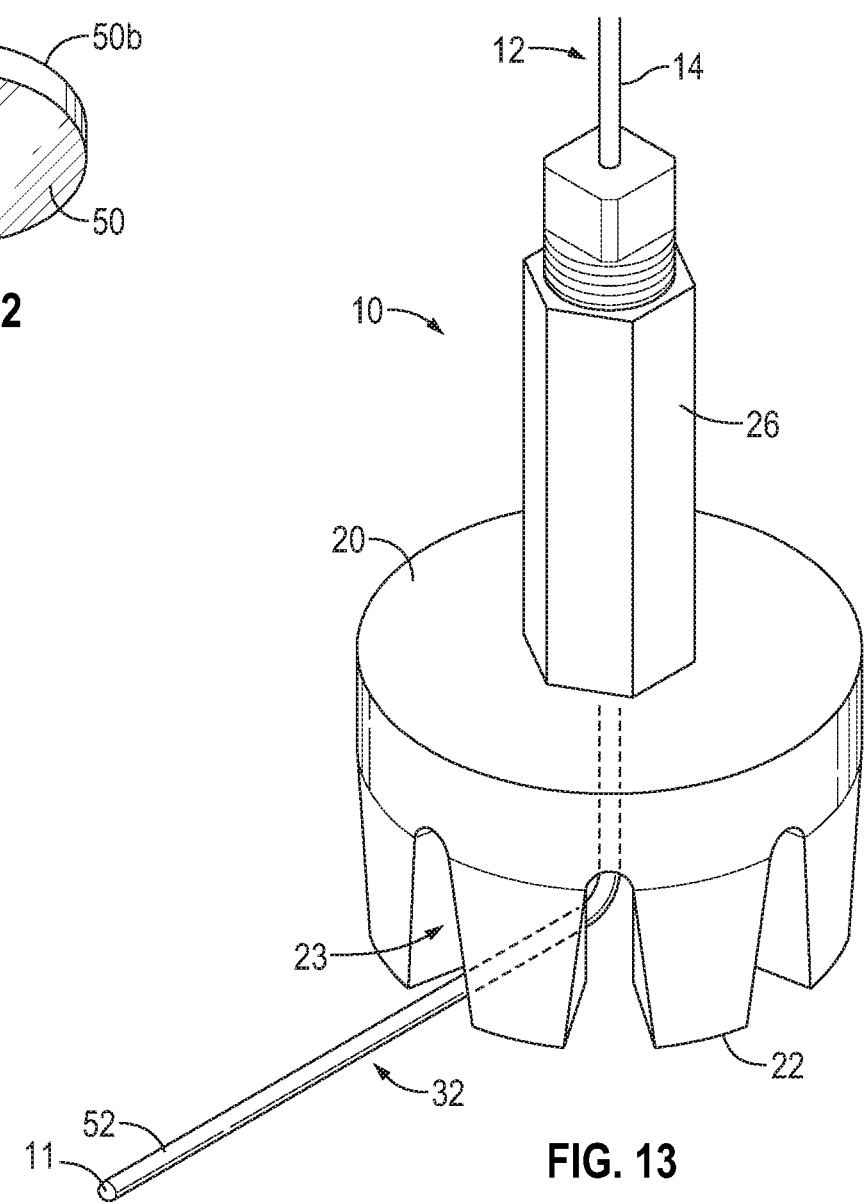
FIG. 13 shows a perspective view of a temperature sensing assembly, according to another embodiment.
Figure 14:
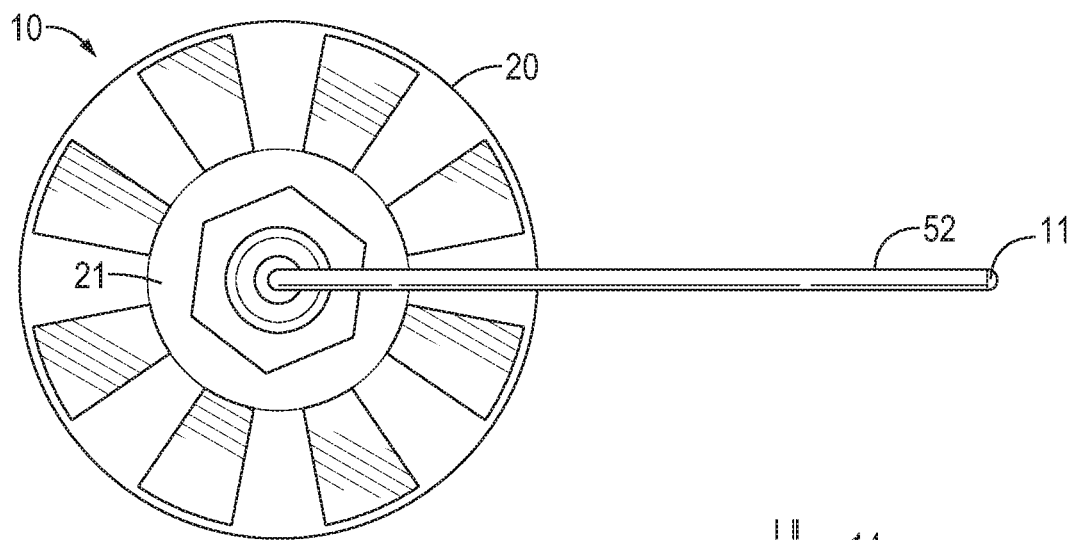
FIG. 14 shows an end view of the temperature sensing assembly of FIG. 13.
Figure 15:
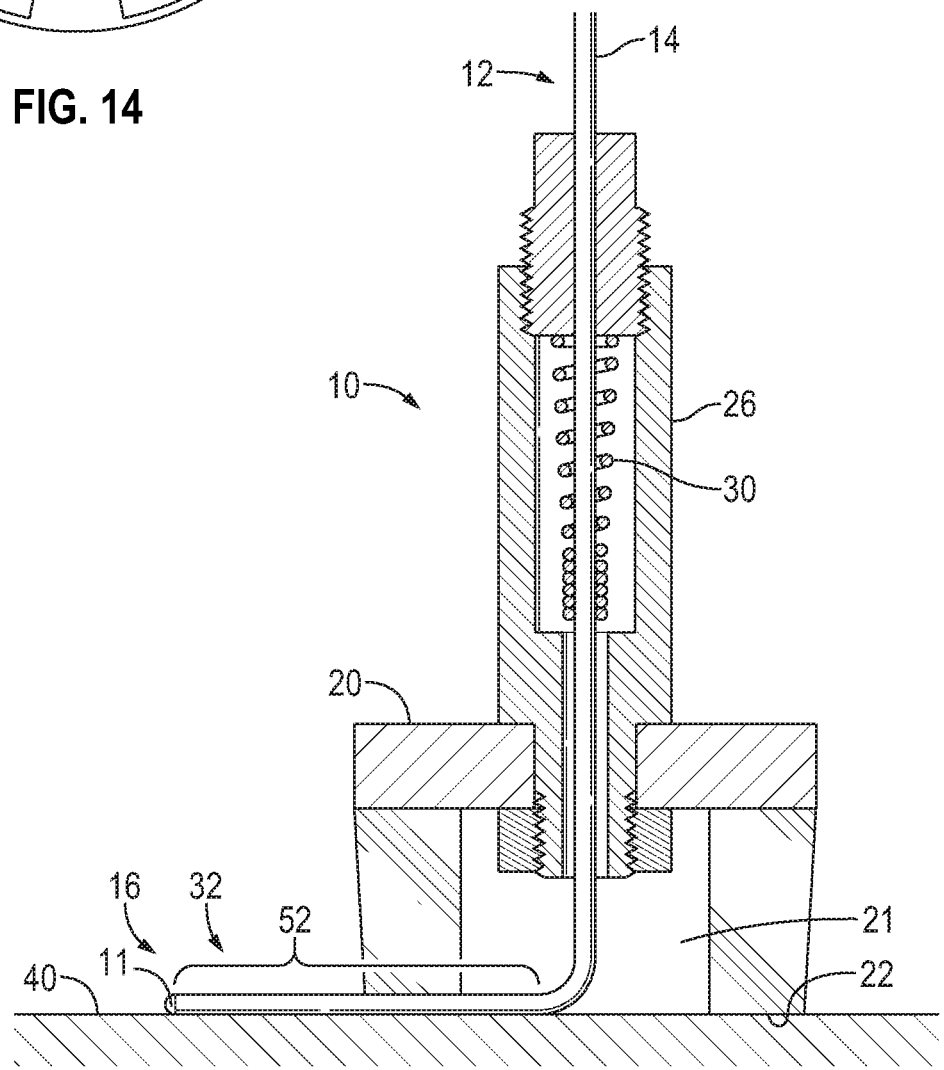
FIG. 15 shows a cross-sectional view of the temperature sensing assembly of FIG. 13.

FIGS. 13-15 show yet another embodiment of the temperature sensing assembly 10. FIG. 13 is a perspective view, FIG. 14 is an end view, and FIG. 15 is a cross-sectional view. In this embodiment, the contact portion 32 includes a contact section 52 of the sheath at the distal end 16 of the sheath 14. In some embodiments, the contact section 52 extends transverse to the section of the sheath 14 that extends through the adapter 26, with a bend between the contact section 52 and the section extending through the adapter 26. When the docking device 20 is coupled to the surface 40, the length of the contact section 52 of the sheath 12 may be in contact with the surface 40. As shown best in FIG. 13, the contact section 52 may extend through an aperture 23 of the docking device 20. The contact section 52 may extend from a first end within the recessed portion 21 of the docking device 20 to a second end spaced apart from the docking device 20 (i.e., outside a perimeter defined by the bottom surface 22 of the docking device 20). The junction point 11 may be disposed at the second end. Because the junction point 11 is spaced apart from the docking device 20, the junction point 11 determines the temperature of the surface 40 at a location that is away from the docking device 20. As a result, the temperature sensed by the junction point 11 may not be impacted by the docking device 20, which may act as a heat sink. In various embodiments, the junction point 11 is at least about two inches.

Figure 17:
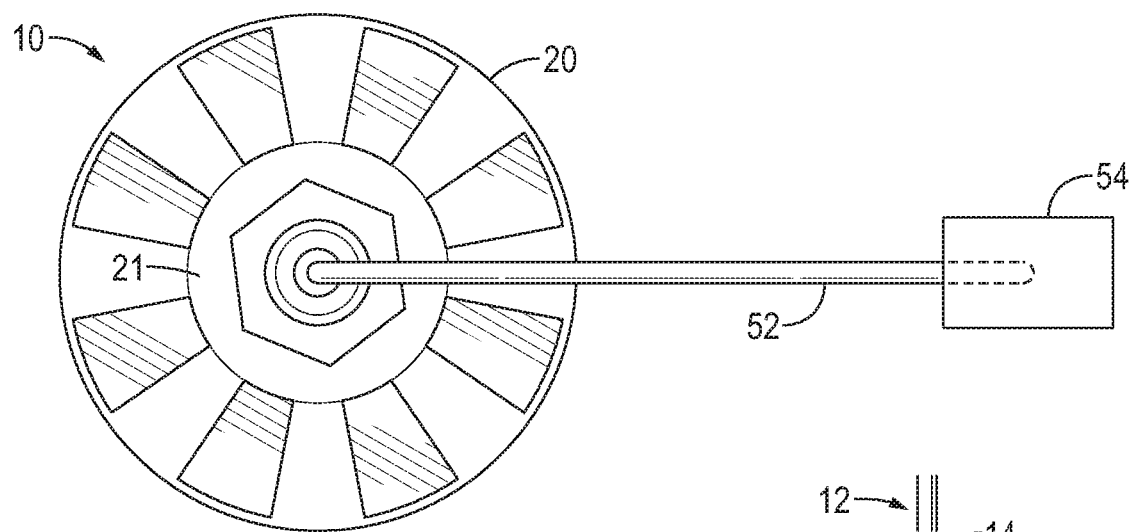
FIG. 17 shows an end view of the temperature sensing assembly of FIG. 16.
Figure 16:
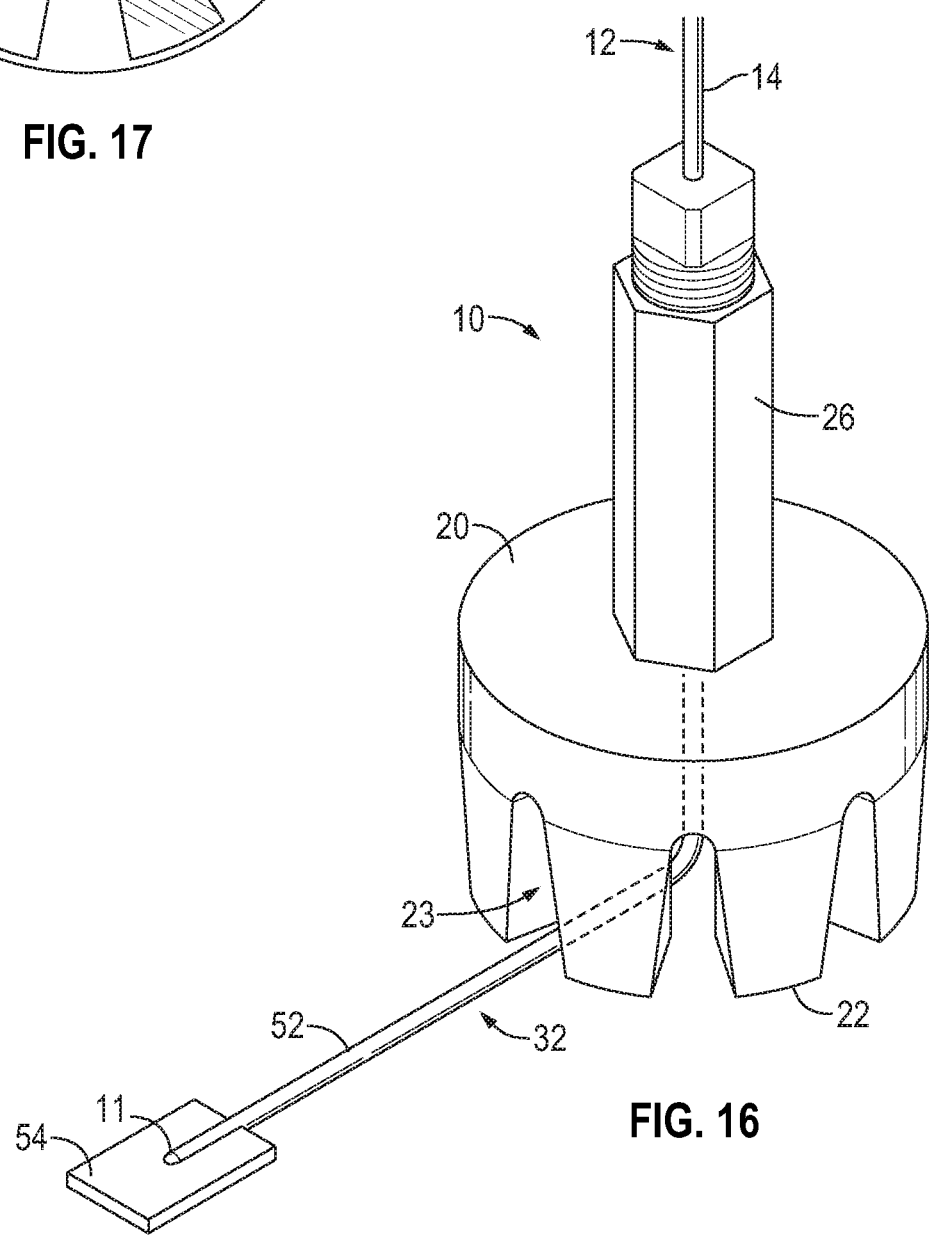
FIG. 16 shows a perspective view of a temperature sensing assembly, according to another embodiment.

As shown in FIGS. 16 and 17, in some embodiments, the contact portion 32 may further include a pad 54 coupled to the second end of the contact section 52, adjacent to the junction point 11 of the thermocouple device 12. FIG. 16 is a perspective view and FIG. 17 is an end view of such an embodiment. The pad 54 increases the contact area between the thermocouple device 12 and the surface 40 to increase the accuracy of the temperature measurement. The pad 54 may be made of a thermally conductive material—such as, for example, copper, aluminum, brass, steel, or bronze.

Figure 18:
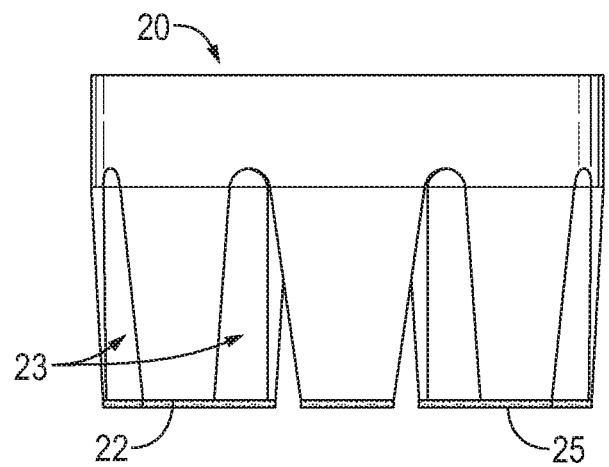
FIG. 18 shows a side view of a docking device, according to another embodiment.
Figure 19:
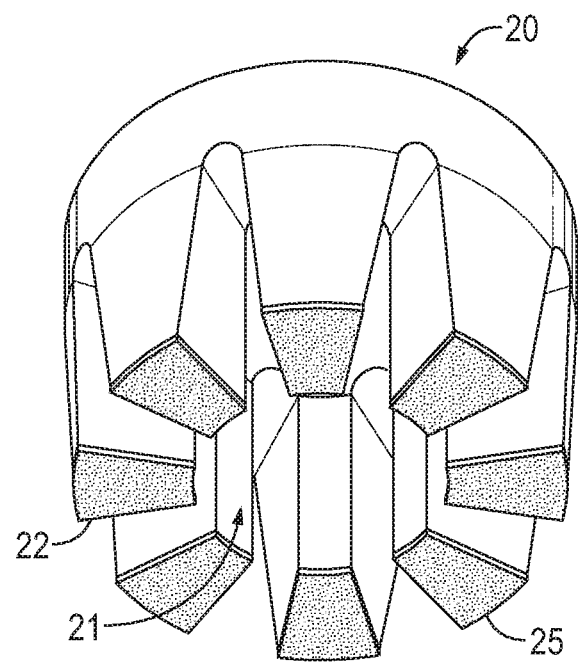
FIG. 19 shows a perspective view of the docking device of FIG. 18.

As shown in FIGS. 18 and 19, in some embodiments, the docking device 20 includes an insulative coating 25 on its bottom surface 40. The insulative coating 25 reduces heat transfer from the surface 40 to the docking device 20 to reduce the impact that the docking device 20 has on the temperature measurement by the thermocouple device 12. The insulative coating 25 may comprise any appropriate material. For example, the coating may be Carrera™ Satin Black coating or MCS coating manufactured by Tech Line Coatings Industries, Inc. of Seymour, Tenn. In some embodiments, the insulative coating 25 is sufficiently thin to allow the docking device 20 to magnetically couple to the surface. For example, in some embodiments, the insulative coating 25 is between 0.01 inches and 0.125 inches thick. Any of the embodiments of the temperature sensing assembly 10 described above may include a docking device 20 with an insulative coating 25, such as shown in FIGS. 18 and 19.

In another aspect, a method of monitoring temperature of a surface of a structure is provided. The method includes attaching a thermocouple device to a docking device, the thermocouple device having a temperature sensing junction point disposed within an elongate sheath and a contact portion configured to contact the surface of the structure. The method further includes attaching a bottom surface of the docking device to the surface of the structure. A line extends through the center of the sheath and the sheath has a cross-sectional area in a plane perpendicular to the line. The contact portion is configured such that, when the docking device is coupled to the surface, an area of contact between the contact portion and the surface of the structure is greater than the cross-sectional area of the sheath. Such methods can include coupling any of the temperature sensing assemblies described herein to the surface of the structure.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention. All patents and published patent applications identified herein are incorporated herein by reference in their entireties.

What is claimed is:

1. A temperature sensing assembly for measuring temperature of a surface of a structure, the assembly comprising:
    a thermocouple device comprising a temperature sensing junction point disposed within an elongate sheath to measure the temperature of the surface of the structure at a desired location, the thermocouple device further comprising a contact portion configured to contact the surface of the structure; and
    a docking device having a bottom surface to attach to the surface of the structure adjacent the desired location, the thermocouple device coupled to the docking device;
    wherein a line extends through the center of the sheath and the sheath has a cross-sectional area in a plane perpendicular to the line, and wherein the contact portion is configured such that, when the docking device is coupled to the surface, an area of contact between the contact portion and the surface of the structure is greater than the cross-sectional area of the sheath; and
    wherein the contact portion of the thermocouple device comprises at least one coil of the sheath, wherein the junction point is disposed within the coil, and wherein, when the docking device is coupled to the surface, at least a portion of the at least one coil is maintained in contact with the surface of the structure.

2. The assembly of claim 1, wherein the junction point is within the contact portion.

3. The assembly of claim 1, further comprising an adapter coupling the thermocouple device to the docking device.

4. The assembly of claim 1, wherein the contact portion comprises at least two coils in a single plane, and wherein a first of the at least two coils is disposed within a boundary defined by a second of the at least two coils.

5. The assembly of claim 1, wherein the boundary defined by the second of the at least two coils is circular.

6. The assembly of claim 1, wherein the docking device comprises an insulative coating on the bottom surface.

7. The assembly of claim 1, further comprising a resilient member to provide a biasing force to maintain the contact portion of the thermocouple device in contact with the surface of the structure when the docking device is attached to the surface of the structure.

8. A temperature sensing assembly for measuring temperature of a surface of a structure, the assembly comprising:
   a thermocouple device having a temperature sensing junction point to measure the temperature of the surface of the structure; and
   a docking device having a bottom surface configured to couple to the surface of the structure, the thermocouple device coupled to the docking device, wherein the bottom surface defines a perimeter;
   wherein the junction point is disposed outside the perimeter of the bottom surface such that, when the docking device is coupled to the surface of the structure, the junction point is positioned to measure the temperature at a point on the surface of the structure that is spaced apart from the docking device.

9. The assembly of claim 8, wherein a section of the sheath is configured to extend along the surface of the structure and to be in contact with the surface for the length of the section.

10. The assembly of claim 8, wherein the thermocouple device further comprises a pad coupled to the sheath, and wherein the junction point is disposed adjacent to the pad.

11. The assembly of claim 8, wherein the docking device comprises an insulative coating on the bottom surface.

12. A method of monitoring temperature of a surface of a structure, comprising:
   attaching a thermocouple device to a docking device, the thermocouple device having a temperature sensing junction point disposed within an elongate sheath and a contact portion configured to contact the surface of the structure; and
   attaching a bottom surface of the docking device to the surface of the structure;
   wherein a line extends through the center of the sheath and the sheath has a cross-sectional area in a plane perpendicular to the line, and wherein the contact portion is configured such that, when the docking device is coupled to the surface, an area of contact between the contact portion and the surface of the structure is greater than the cross-sectional area of the sheath; and
   wherein the contact portion of the thermocouple device comprises at least one coil of the sheath, wherein the junction point is disposed within the coil, and wherein, when the docking device is coupled to the surface, at least a portion of the at least one coil is maintained in contact with the surface of the structure.

* * * * *